Patented June 24, 1947

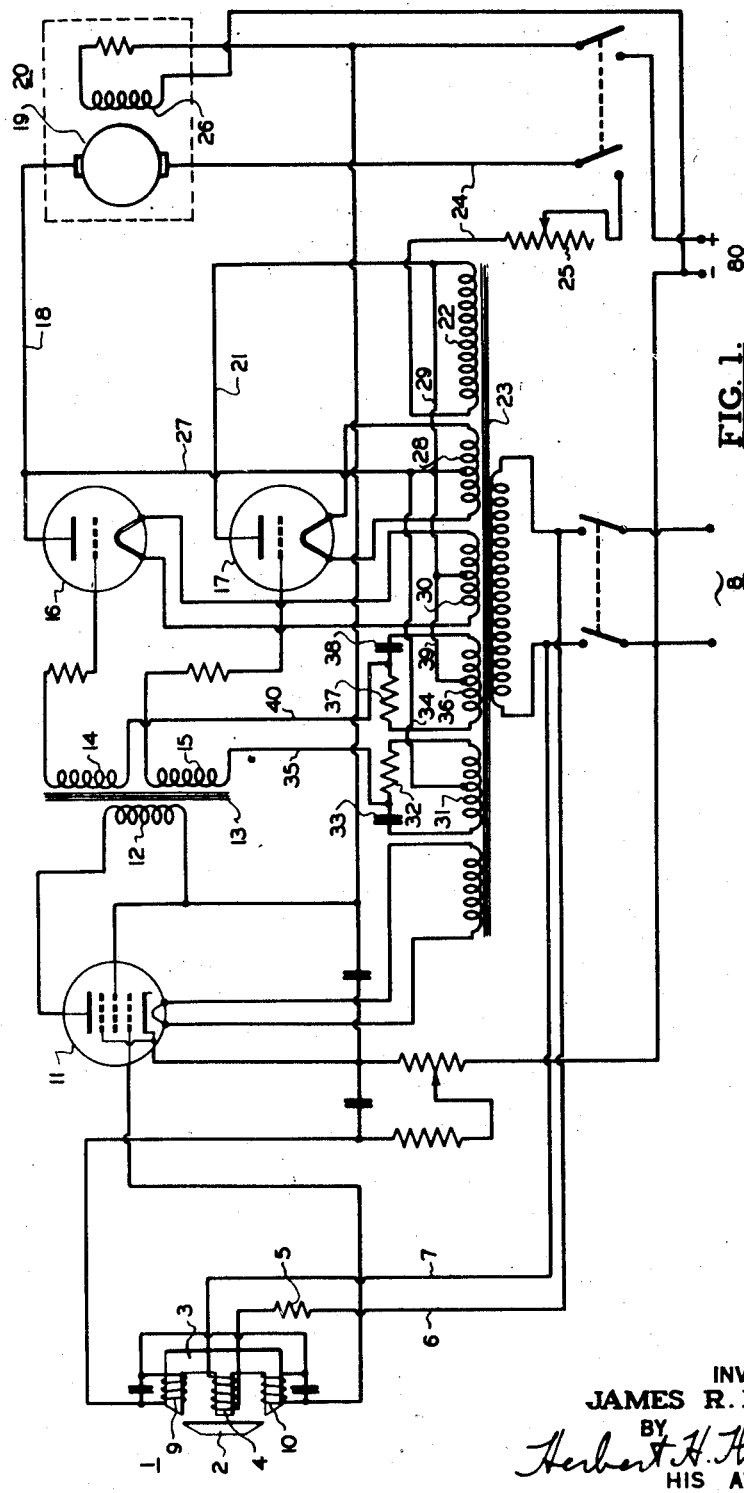

2,422,687

UNITED STATES PATENT OFFICE 2,422,687

GYROCOMPASS AMPLIFIER CIRCUIT

James R. Lilienthal, Brooklyn, N. Y., assignor to Sperry Gyroscope Company, Inc., Brooklyn, N. Y., a corporation of New York Application February 3, 1943, Serial No. 474,626

2 Claims. (Cl. 172—239)

1

The circuit of my invention is particularly adapted for use as a signal amplifier for controlling the azimuth motor of a gyrocompass, or other follow-up or positionally controlled element.

Gyrocompasses comprise a vertical ring which, through the operation of the compass, is maintained in one position of orientation, such as in a north-south plane. The compass may provide direct readings or be employed in controlling repeater compasses and, for this purpose, a phantom ring or phantom element is used and controlled by an azimuth motor to maintain a predetermined position with respect to the vertical ring or to lie in alignment therewith.

The circuit of my invention, because of its operating characteristics, is particularly adapted for use in controlling the azimuth motor to maintain the phantom and vertical rings in alignment or to return the phantom ring into alignment if relative displacement between the rings should occur. The phantom ring rather than the vertical ring controls the repeater compasses by repeating the linear reference provided by the vertical ring but without subjecting the vertical ring to any reaction caused by the repeater compass systems which may otherwise produce error in the directional indications provided by the vertical ring.

It is a first object of my invention to provide an amplifier circuit for a gyrocompass which will function in response to a signal representing displacement between the phantom and vertical rings to control the azimuth motor to return said rings into alignment without undue oscillation of the phantom ring or without appreciable hunting.

Another object resides in providing an amplifier circuit in which two electron discharge tubes are employed and so arranged as to continuously supply energizing currents in opposing directions to the azimuth motor.

Still another object resides in providing a circuit of the foregoing character in which a fixed field, D. C. motor or one having like back E. M. F.-generating characteristics is employed as the azimuth motor, whereby the back armature E. M. F. generated in the armature upon rotation thereof is effective in damping the system.

Still another object resides in providing a system of the character last above referred to in which a means is provided for limiting the plate current output of the electron discharge tubes whereby the current may be limited to a value affording most favorable damping effects by the azimuth motor itself.

With the foregoing and other objects in view, my invention includes the novel circuit and the correlation and arrangement of elements therein

2 described below and illustrated in the accompanying drawing, in which—

Fig. 1 is a wiring diagram of the preferred circuit of my invention; and

Figure 2 represents the phasing arrangement of the electron discharge tubes controlling the current to the azimuth motor of Fig. 1.

It will be understood that the circuit of my invention may conceivably be used for various purposes including the control of torque or servomotors and the like, but because of its adaptability for use in connection with a gyrocompass I have illustrated and, in the following, will describe the circuit in connection with this latter use.

A signal transformer, indicated generally at 1, is employed to provide a signal indication of relative displacement between the vertical ring and phantom ring of the gyrocompass. The signal transformer comprises an armature 2 and an E-shaped core 3, one of which is fixed to and movable with the vertical ring while the other is positioned by the phantom ring. The central leg of core 3 is provided with an energizing winding 4 which is connected through resistor 5 and conductors 6 and 7 across a source of alternating current 8. The outer legs of the core 3 are provided with secondary windings 9 and 10, respectively, in which are induced potentials depending upon the amount of flux passing through their associated core legs. For example, if the armature 2 is moved nearer to one outer core leg and away from the other, more flux is passed through the first-mentioned core leg than through the second, and a higher potential will be induced in the coil associated with the first-mentioned core leg than in the coil on the second core leg. These coils are connected in series opposition and therefore the difference between these voltages will be applied as a signal to the control grid of an amplifier tube 11. Tuning condensers may be connected across the secondary coils as shown.

When the armature 2 is positioned to distribute the flux equally between the outer legs of core 3, the potentials in the secondary coils 9 and 10 will be equal and opposite and no signal will be supplied to the amplifier tube 11. Movement of the armature toward one or the other of the outer core legs will provide a signal having a phase sense depending on the direction of movement of the armature 2 relative to the legs of the core.

Tube 11 is designed to operate as a linear amplifier and supply the amplified signal to the primary 12 of an input transformer 13, the secondaries 14 and 15 of which supply signal current to the grids of electron discharge tubes 16 and 17.

The plate of tube 16 is connected through conductor 18 to one side of the armature 19 of an azimuth motor 20. The plate of tube 17 is connected through conductor 21 through a secondary winding 22 of a power transformer 23 and through conductor 24 to the other side of the armature of the azimuth motor. A variable resistor 25 is included between the secondary 22 of the transformer and the armature of the azimuth motor to control and limit the armature current supplied by the tubes 16 and 17, for the purpose hereinafter set forth.

The azimuth motor is preferably of the shunt or fixed field, D. C. type or one having like back E. M. F.-generating characteristics. The field 26 of the motor is connected together with a series field resistor across a source of direct current supply indicated at 80, and a switch, as illustrated, may be incorporated to make or break the armature and field circuits of the motor.

The plate of tube 16 is also connected through conductor 27 to the middle tap of a secondary coil 28 of transformer 23 which supplies exciting current to the cathode or filament of tube 17. Likewise, the plate of tube 17 is connected through conductor 29 to the center tap of a secondary coil 30 of transformer 23 which serves to supply exciting current to the cathode or filament of tube 16.

An alternating current, bias potential is supplied to the grids of tubes 16 and 17 and in such phase relation to the plate voltages thereof as to provide substantially continuous firing of both tubes on their positive plate voltage half cycles. This grid bias for the grid of tube 17 is obtained from the secondary coil 31 of transformer 23 through the phase shifting circuit comprising resistor 32 and condenser 33. The output of this circuit is connected through conductor 34 to the cathode of tube 17 and through conductor 35 to one end of the secondary 15 of input transformer 12, the other end thereof being connected, as hereinbefore described, to the grid of tube 17. A grid bias is supplied in a similar manner to the grid of tube 16. This latter grid biasing circuit comprises the secondary coil 36 of transformer 23, and resistance 37 and condenser 38 of a phase adjusting circuit, the output of which is connected through conductor 39 to the cathode of tube 16 and through conductor 40 to one side of the secondary 14 of the transformer 13, which secondary is also connected to the grid of tube 16.

In accordance with my invention, the plate voltages of tubes 16 and 17 are out of phase or in phase opposition and the alternating current bias potentials supplied to the grids of tubes 16 and 17 are so phased with respect to the plate voltages as to provide firing of the tubes on each positive plate voltage half cycle, as schematically shown in Fig. 2. In this showing, the tube will fire at the point represented by the dot-dash line $t$. With no signal, the tubes are designed to provide substantially equal plate outputs and therefore no operation of the azimuth motor 20 will be effected. However, when a signal is supplied to the grids of these tubes, the phase relationship of the combined grid potentials with respect to the plate voltage of each tube will vary so as to cause one tube to fire earlier than normal and the other tube to fire later. When this occurs, either tube 16 or tube 17 will supply a plate current of greater magnitude than the other and the phase sense of the signal will determine which of these tubes supplies the greater plate output. In other words, when the core 3 and armature 2 of the signal transformer move relatively in one direction, one of tubes 16 or 17 will provide a greater plate output while that from the other tube will diminish and, when the displacement of armature 2 and core 3 occurs in the opposite direction, the outputs from tubes 16 and 17 will vary in the reverse manner to that above described.

When a D. C., fixed field motor is employed, a counter-E. M. F. will be generated in the armature due to its rotation and such E. M. F. will tend to oppose the current producing the rotation. In the circuit, hereinabove described, this counter-E. M. F. will oppose the plate current of one tube which, being of greater magnitude, was causing rotation of the armature in one direction or the other and will add to the plate output of the other tube. Hence, a damping effect is produced which functions in connection with the continuous operation of both tubes effectively to prevent undesired oscillations or appreciable hunting of the motor. The variable resistor 25 is employed to control and limit the magnitudes of the plate currents supplied to the armature of motor 20 to such values that the damping effect of the motor may be utilized to the desired extent.

It will be observed that, due to the fact that both tubes are arranged continuously to operate and while no signal current is supplied to the grids thereof, the system has no "dead spot" or point or zone in which control over the azimuth motor is lost. Furthermore, the armature motor current is a function of the signal and an inverse function of motor speed, both of these relationships being substantially linear. Therefore, close control of the azimuth motor is provided for all values of signal current and since the system quickly responds to any change in signal current, very little damping is necessary and that provided by the azimuth motor itself has proven to be entirely adequate.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an amplifier circuit for a gyrocompass, a source of alternating current, a pair of electron discharge tubes each including a control electrode and plate circuit elements, the plate elements thereof being connected in out-of-phase relation to said source of current, means for supplying alternating bias potentials to the control electrodes of said tubes in such phase relation to the plate potentials thereof as to provide firing of both tubes on positive plate half cycles for all values of signal voltage applied to the control electrodes of said tubes, means for supplying signal voltages to the control electrodes of said tubes, and a direct-current motor having its armature connected in the plate circuits of both of said tubes but in opposite relation to the plate elements so that the respective plate currents of said tubes flow in opposite directions through said armature and tend to rotate said motor in opposite directions.

2. In an amplifier circuit for a gyrocompass, a source of alternating current, a pair of electron discharge tubes including grid and plate circuit elements, the plate elements thereof being connected in out-of-phase relation to said source of current, means for supplying alternating bias potentials to the grids of said tubes in such phase relation to the plate potentials thereof as to provide firing of both tubes on positive plate half cycles for all values of signal voltage applied to the grids thereof, means for supplying signal voltages to the grids of said tubes, and a fixed-field, direct-current motor having its armature connected in the plate circuits of both of said tubes but in opposite relation to the plate elements so that the respective plate currents of said tubes flow in opposite directions through said armature and tend to rotate said motor in opposite directions.

JAMES R. LILIENTHAL.

REFERENCES CITED

The following references are of record in the file of this patent:

UNITED STATES PATENTS

| Number | Name | Date |
|---|---|---|
| 2,218,477 | Parker et al. | Oct. 15, 1940 |
| 2,275,317 | Ryder | Mar. 3, 1942 |
| 1,959,805 | Wittkuhns et al. | May 22, 1934 |
| 1,982,350 | Mittag | Nov. 27, 1934 |
| 2,047,988 | Wittkuhns et al. | July 21, 1936 |
| 2,147,674 | Satterlee | Feb. 21, 1939 |
| 2,175,009 | Anderson | Oct. 3, 1939 |

OTHER REFERENCES

"Thyratrons and their Uses," Alexandersson, page 9, "Electronics," Feb. 1938. Copy available in Div. 26—1396.